(No Model.) 2 Sheets—Sheet 1.
E. G. ROWEN.
INDICATOR FOR RAILWAYS.
No. 466,141. Patented Dec. 29, 1891.
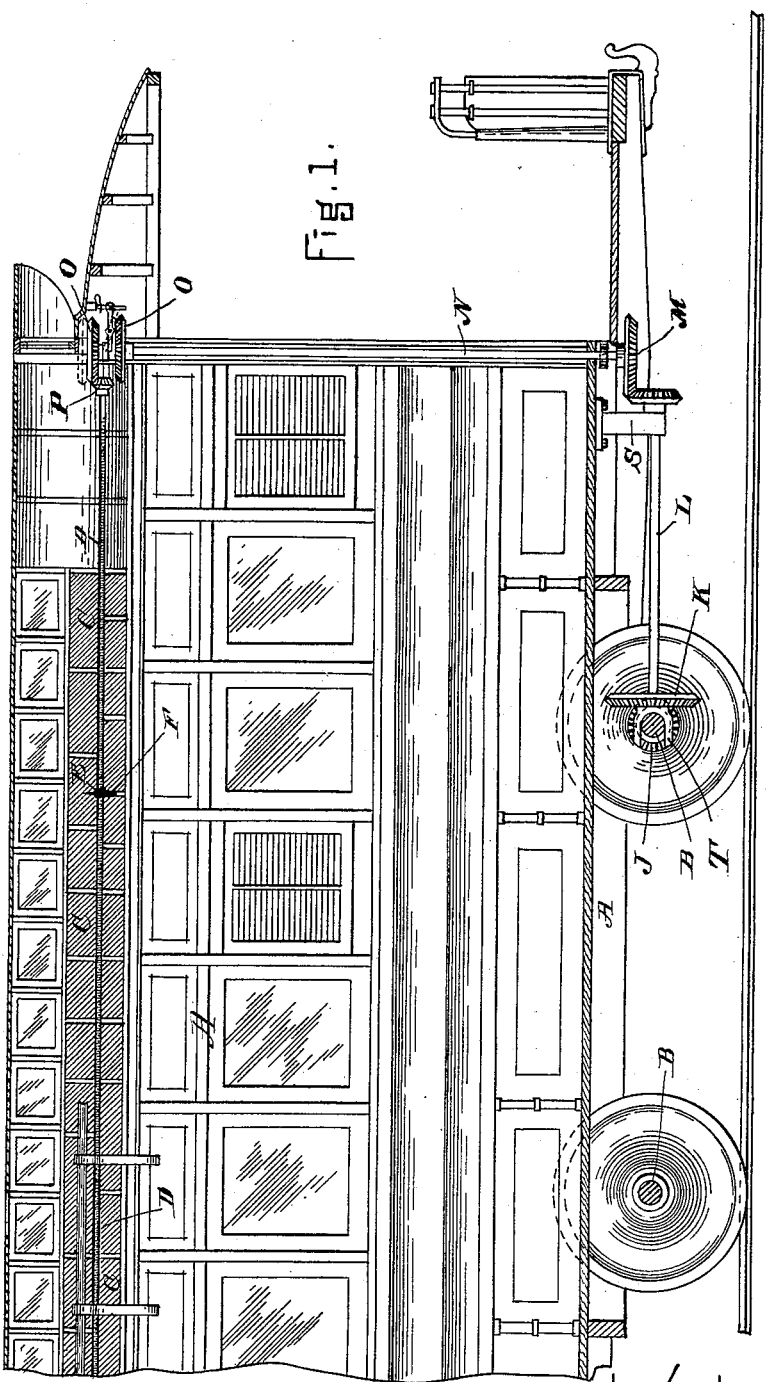
Witnesses.
Henry Marsh.
William Fessenden
Inventor.
Edward G. Rowen
by A. H. Reeves
Attorney (No Model.) 2 Sheets—Sheet 2.
E. G. ROWEN.
INDICATOR FOR RAILWAYS.
No. 466,141. Patented Dec. 29, 1891.
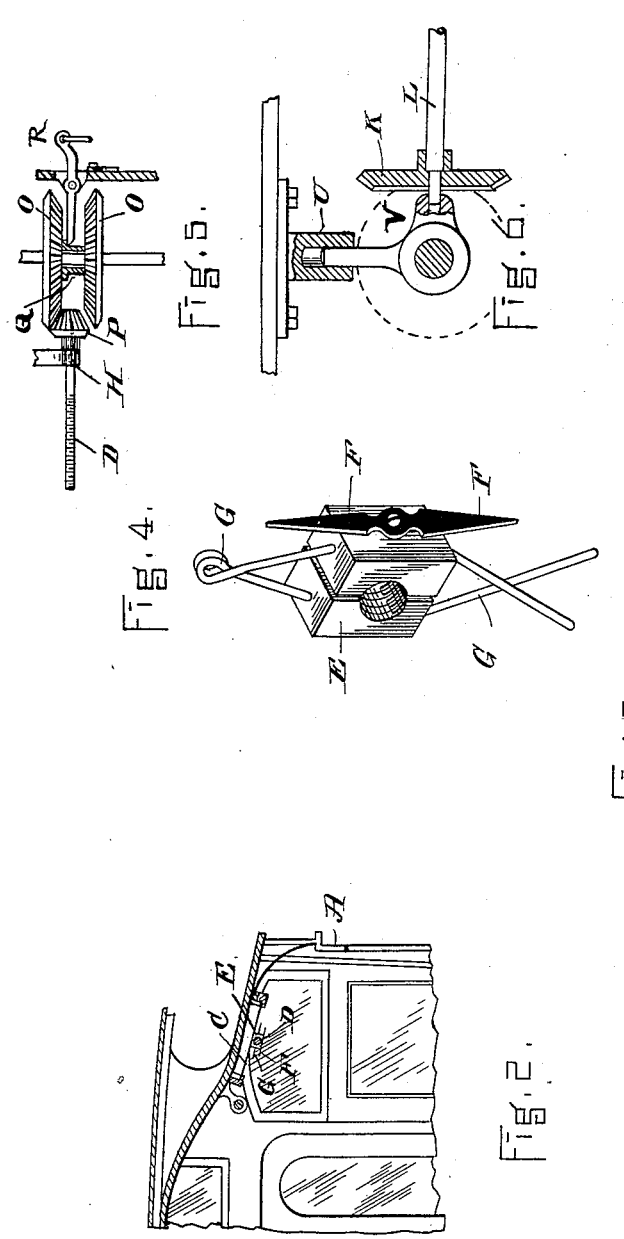
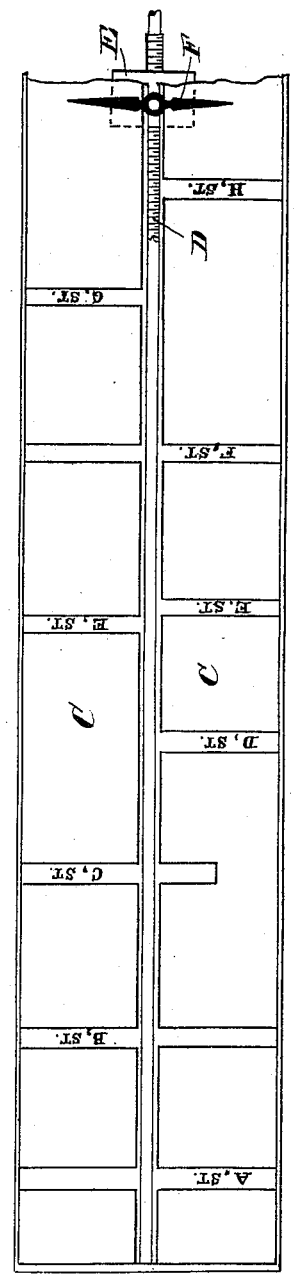
Witnesses.
Inventor.
Edward G. Rowen

UNITED STATES PATENT OFFICE.

EDWARD G. ROWEN, OF BOSTON, MASSACHUSETTS.

INDICATOR FOR RAILWAYS.

SPECIFICATION forming part of Letters Patent No. 466,141, dated December 29, 1891.

Application filed May 3, 1890. Serial No. 350,435. (No model.)

*To all whom it may concern:*

Be it known that I, EDWARD G. ROWEN, of Boston, in the county of Suffolk and State of Massachusetts, have invented certain new and useful Improvements in Indicators for Railways, of which the following, taken in connection with the accompanying drawings, is a specification.

The object of my invention is to provide for railway-cars, and especially for street-cars of various kinds, an improved automatic indicator to denote not only the various streets that are passed and to be passed, but also to show whether they lead to the right or left, and to present at a glance a chart of the entire route, showing at any moment the relation of the moving car to any given point on the line.

For steam-cars on long lines my apparatus is of great value, the various stations being indicated on the chart or profile, and the advancing pointer denoting, silently, the approach to each in its turn.

A peculiarity of my invention is an extended chart or diagram of the route traversed by the car, such diagram being conspicuously posted in the upper part of the car-body along the center or on one or both sides or ends thereof. Parallel with this chart is a revolving threaded rod or an equivalent support for a movable pointer automatically caused to traverse such rod and actuated by the rotation of the car wheel or axle. The body of the pointer is a threaded nut fitting the threads of the revolving rod, so that said pointer may be moved slowly along the face of the chart, the gearing being so arranged as to cause this movement to correspond to the movement of the car along its route. The nut is split and its halves, spring-pressed together normally, furnished with arms or levers for separating the parts sufficiently for any longitudinal adjustment required. The gearing is so arranged as to reverse the movement of the pointer when required, and it is connected in constant mesh with the gear-wheel on the axle by means of a bearing mounted on the axle and thus unaffected by the swaying or vertical yielding of the car-body.

In the drawings, Figure 1 is an elevation of the interior of a common street-car provided with my improvement. Fig. 2 is a detail cross-section showing one position of the chart. Fig. 3 is an enlarged diagram of a part of the chart. Figs. 4, 5, and 6 are details of the invention, Fig. 4 showing the pointer and split nut, Fig. 5 a device for reversing the motion of the threaded rod, and Fig. 6 a means of preventing disconnection and binding of the gearing due to yielding of the car on its springs.

A represents the body of the car, having its wheels fixed upon the rotating axles B.

C is a chart or diagram of the route to be traversed by the car, the line being represented straight from end to end whatever turns it may make, and the various intersecting streets or points of importance along the route being indicated by name, the chart showing, by preference, on which side such streets or points are to be found. This chart is to be conspicuously mounted in the upper portion of the car, where it can best be seen, the illustration showing it under the sloping roof between the usual ventilators and the space devoted to advertising. If so located, the device will naturally be duplicated on the opposite side.

Along the center of the chart C is stretched a screw-threaded rod D. (Shown in Figs. 1 and 2 as in front of the chart.) On this rod is a nut E, threaded to engage with the threads of the rod D, which is caused to revolve slowly by a suitable connection with the rotating axles B, whereby the nut E, carrying a pointer F, is made to traverse the rod D at a rate of speed corresponding to that of the moving car, so that the pointer F will always denote the position of the car relatively to the various streets and points along the route. The rod D and nut E may be placed behind the chart, with the pointer F in front of it, as in Fig. 3, the chart being slotted longitudinally or made in two parts side by side with a slight space between them, representing the street traversed. Through this slot or space passes the stem of the screw or rivet which secures the pointer to the nut. The nut E is preferably split axially into two equal parts, which may be somewhat separated to permit it to be rapidly adjusted lengthwise of the rod D in case of necessity. Such adjustment may thus be made without rotation of the rod.

The parts of the nut are normally pressed toward each other by a suitable spring.

In Fig. 4, G is a wire spring formed in a central coil, the prongs diverging thence to the halves of the nut, then extending straight down and passing through a hole in each half, then converging to and crossing each other, so that pressure on the extremities by the thumb and finger will separate the parts of the nut and enable it to be moved either way along the rod as far as desired. At each end near its bearings H the rod may be reduced in diameter by removing the threads, as in Figs. 1 and 5, so that at such points the nut will lie dormant until started by engagement with the threaded part of the shaft.

The means shown for actuating the pointer by rotation of the rod include a bevel-gear J on the axle B, meshing with a larger one K on a nearly-horizontal shaft L, which has a small gear upon its opposite end engaging with a larger one M at the bottom of an upright shaft N. The upper end of this shaft has two bevel-gears O, meshing alternately with gear P, fixed on the end of the rod D, which is thereby rotated when the car moves. The gears O are secured to a short sleeve Q, Fig. 5, turning with the shaft N, but having a slight vertical movement thereon, so as to bring either one into mesh with the gear P on the threaded rod in order to change its direction of rotation when desired. The sleeve may be so centrally placed as to hold both gears O out of engagement with gear P in case it is desired to stop the movement of the indicator F. The lever R, which moves the sleeve, has a suitable fastening to hold it in either position.

In Fig. 1 the horizontal shaft L is provided at its outer end with a simple bearing supported by a metal strap S from the car-bottom. The opposite end has a yoke T fitting loosely around the axle, so as to be supported thereby with the gears J and K in mesh, notwithstanding considerable vertical movement of the car-body with relation to the axle. Collars on the axle keep the yoke in place thereon.

In Fig. 6 the end of the shaft L enters a suitable bearing in a hub V on the axle, and a stem from such hub extends up into a socket U under the car-body to permit vertical movement without rotation of the hub.

When the chart and indicating mechanism are duplicated on opposite sides of the car, a transverse shaft meshing with the gears O O, respectively, may communicate the rotation desired.

I claim as my invention—

1. In a railway-indicator, the permanent chart C, the revolving threaded rod D, parallel therewith, and the pointer F, having a threaded nut engaging the threads of said rod and thereby caused to traverse it, in combination with suitable shafts and gearing for communicating motion to said rods from the rotating axle, and with a bearing for one of said shafts, mounted on the axle independent of the car-body and adapted to support the gear on said shaft in constant mesh with the axle-gear, substantially as set forth.

2. In a railway-indicator, the chart C, secured within the car, the rod D, parallel therewith and having a rotary motion derived from the car-axle, and the traveling pointer thereby caused to denote on said chart the position of the car on its route, in combination with a split nut forming the body of said pointer and with suitable springs and projecting arms for closing said nut for action and opening it for adjustment longitudinally on said rod, substantially as set forth.

In testimony whereof I have signed my name to this specification, in the presence of two subscribing witnesses, on this 28th day of December, A. D. 1889.

EDWARD G. ROWEN.

Witnesses:
A. H. SPENCER,
JAMES P. PRINCE.